(12) United States Patent
Reischmann et al.

(10) Patent No.: US 8,631,739 B2
(45) Date of Patent: Jan. 21, 2014

(54) GRILL

(75) Inventors: Michael Reischmann, Eustis, FL (US); Phillip Williams, Clinton, CT (US)

(73) Assignee: Kenyon International, Inc., Clinton, CT (US)

( * ) Notice: Subject to any disclaimer, the term of this patent is extended or adjusted under 35 U.S.C. 154(b) by 1561 days.

(21) Appl. No.: 11/473,361

(22) Filed: Jun. 22, 2006

(65) Prior Publication Data
US 2007/0295223 A1  Dec. 27, 2007

(51) Int. Cl.
*A47J 27/00* (2006.01)
(52) U.S. Cl.
USPC ................................ 99/446; 99/444
(58) Field of Classification Search
USPC ........... 99/327–333, 339, 340, 483, 444–450, 99/467–482; 219/521–525, 536–541, 482, 219/483, 450.1, 385; 307/18–29
See application file for complete search history.

(56) References Cited

U.S. PATENT DOCUMENTS

| | | | |
|---|---|---|---|
| 3,848,110 A * | 11/1974 | Giguere et al. | 219/525 |
| 4,705,021 A | 11/1987 | Beach | |
| 5,000,157 A | 3/1991 | Harper, Jr. et al. | |
| 5,003,960 A | 4/1991 | Hanagan | |
| 5,025,130 A * | 6/1991 | Slone | 219/203 |
| 5,124,533 A | 6/1992 | Dommer et al. | |
| 5,171,973 A * | 12/1992 | Higgins | 219/457.1 |
| 5,284,671 A * | 2/1994 | Stewart | 426/523 |
| 5,333,596 A | 8/1994 | Clifford | |
| 5,546,851 A * | 8/1996 | Goto | 99/446 |
| 5,617,840 A | 4/1997 | Clifford | |
| 5,719,377 A | 2/1998 | Giebel et al. | |
| 5,778,145 A | 7/1998 | De Nichilo | |
| 5,802,957 A | 9/1998 | Wanat et al. | |
| 5,813,394 A | 9/1998 | Clifford | |
| 5,967,134 A | 10/1999 | Harris | |
| 6,016,669 A | 1/2000 | Correa et al. | |
| 6,017,211 A | 1/2000 | Gort et al. | |
| 6,037,571 A * | 3/2000 | Christopher | 219/450.1 |
| 6,116,150 A * | 9/2000 | Greenfield, Jr. | 99/332 |
| 6,133,554 A | 10/2000 | Clifford | |
| 6,184,499 B1 | 2/2001 | Antoine | |

(Continued)

FOREIGN PATENT DOCUMENTS

DE  2719706 A1  11/1978
EP  0729292 A1  8/1996

OTHER PUBLICATIONS

Partial European Search Report, EP07290773, Nov. 11, 2008, 6 pages.

*Primary Examiner* — Henry Yuen
*Assistant Examiner* — Ket D Dang
(74) *Attorney, Agent, or Firm* — St. Onge Steward Johnston & Reens LLC

(57) ABSTRACT

The invention relates to a grill having a heating element for heating food, a cooking grate positioned above the heating element and having a plurality of openings for permitting grease to pass where the plurality of openings are arranged around the heating element, and a touch control for adjusting a temperature of said heating element. The touch control has an increase button to elevate the temperature of the heating element and a decrease button to lower the temperature of the heating element. The touch control also has a plurality of lights arranged in sequential order from a first light to an nth light, wherein manipulation of the increase button or decrease button commences illumination

4 Claims, 4 Drawing Sheets

(56) References Cited

U.S. PATENT DOCUMENTS

| | | | |
|---|---|---|---|
| 6,425,319 B1 * | 7/2002 | Wu | 99/332 |
| 6,903,312 B2 * | 6/2005 | Miura et al. | 219/506 |
| 6,936,801 B1 * | 8/2005 | Head | 219/702 |
| 2001/0018868 A1 * | 9/2001 | Brady | 99/332 |
| 2001/0032546 A1 | 10/2001 | Sharpe | |
| 2004/0112362 A1 | 6/2004 | Bruno et al. | |
| 2004/0112365 A1 | 6/2004 | Johnson et al. | |
| 2005/0204927 A1 * | 9/2005 | Boyle et al. | 99/389 |
| 2005/0205545 A1 * | 9/2005 | Siegel et al. | 219/386 |

* cited by examiner

GRILL

FIELD OF THE INVENTION

The invention relates to a cooking grill.

BACKGROUND OF THE INVENTION

Grills are generally known to cook food while permitting grease to drip off. A traditional grill is usually controlled by varying the amount of gas flowing to the burner, which may present a problem where the burner is easily extinguished at low temperatures (low flow rate). If this happens, fuel will possibly continue to flow to the burner even though the fuel is not being burned and this poses a dangerous hazard.

In addition, when cooking is completed, a conventional grill is usually left on for a period of time to burn off residue on the cooking grate, which often requires the user to remember to shut the grill off. In the event the user forgets, this also poses a dangerous hazard that may result in a fire.

Further, a grill's controls may be difficult to read, particularly if there are numerous dials or gauges and the user needs the information quickly, such as when the user is busy cooking food. Also, if the grill's controls are spread out over a large area or if the details, such as numerals or gas level indicators, are small or difficult to read, the user may not be able to readily read the controls and this could affect the user's cooking.

U.S. Pat. Nos. 5,003,960 and 5,617,840 seem to depict the grill's controls with dials and read outs extending over the entire width of the grill or cooking surface. U.S. Pat. No. 5,813,394 seems to show the grill's controls extending over at least half of the width of the grill.

Another disadvantage with conventional grills may be flare-ups. Flare-ups normally occur when a piece of fat or food falls through the grill rack and lands on the gas burner. Because the burner usually gets extremely hot, the fallen food could cause flames to increase and flare-up at that particular location. Flare-ups can overcook or burn a portion of a food article. Therefore, cooks generally monitor the grill rack so they can extinguish any flare-ups that might occur.

Another problem with conventional gas grills may be hot spots. Hot spots are the areas directly above the burners, which are typically hotter than other locations of the grill rack. Hot spots may cause portions of food articles to cook faster than others. Consequently, cooks must monitor the cooking and rearrange the food articles to ensure even cooking.

Another disadvantage with conventional gas grills may be the smoke caused by flare-ups and charcoal burning in addition to charring of food. The smoke could create harmful emissions and the charred food results in the consumption of injurious carcinogens.

What is desired, therefore, is a grill with an easy to read control that quickly indicates information to a user. Another desire is a grill that reduces flare ups, hot spots, and smoking. A further desire is a grill with enhanced safety features.

SUMMARY OF THE INVENTION

It is therefore an object of the invention to provide a grill that is easy to read and provides information to a user in a quick manner.

Another object is a grill with a design that reduces flare ups, hot spots, and smoking.

A further object is a grill with enhanced safety features.

These and other objects of the invention are achieved by a grill having a heating element for heating food, a cooking grate positioned above the heating element and having a plurality of openings for permitting grease to pass where the plurality of openings are arranged around the heating element, and a touch control for adjusting a temperature of said heating element. The touch control has an increase button to elevate the temperature of the heating element and a decrease button to lower the temperature of the heating element. The touch control also has a plurality of lights arranged in sequential order from a first light to an nth light, wherein manipulation of the increase button or decrease button commences illumination of the plurality of lights beginning with the first light and ending with the nth light.

It should be known that a value of n is based upon manipulation of the increase button or decrease button. The manipulation of the touch control button has a linear relationship to the value of n. The cooking grate includes a cover positioned over the heating element and the plurality of openings are arranged around the cover.

In some embodiments, the touch control includes a power button, wherein the plurality of lights are arranged in an arc around the power button. Optionally, power level indicator is arranged in an arc around the plurality of lights and gradually expanding in size as the power level indicator extends toward the nth light. In one embodiment, n is a value selected from the group consisting of 0-1000. In another embodiment, n is a value selected from the group consisting of 1-8.

In a further embodiment, the grill includes an indicator light for indicating whether or not power is being supplied to the grill, an emergency power cut-off button for cutting power to the grill, and a reset button for restoring power to the grill. Optionally, the grill has an automatic shut-off switch that automatically cuts power to the grill.

DETAILED DESCRIPTION OF THE INVENTION

Figure 1:
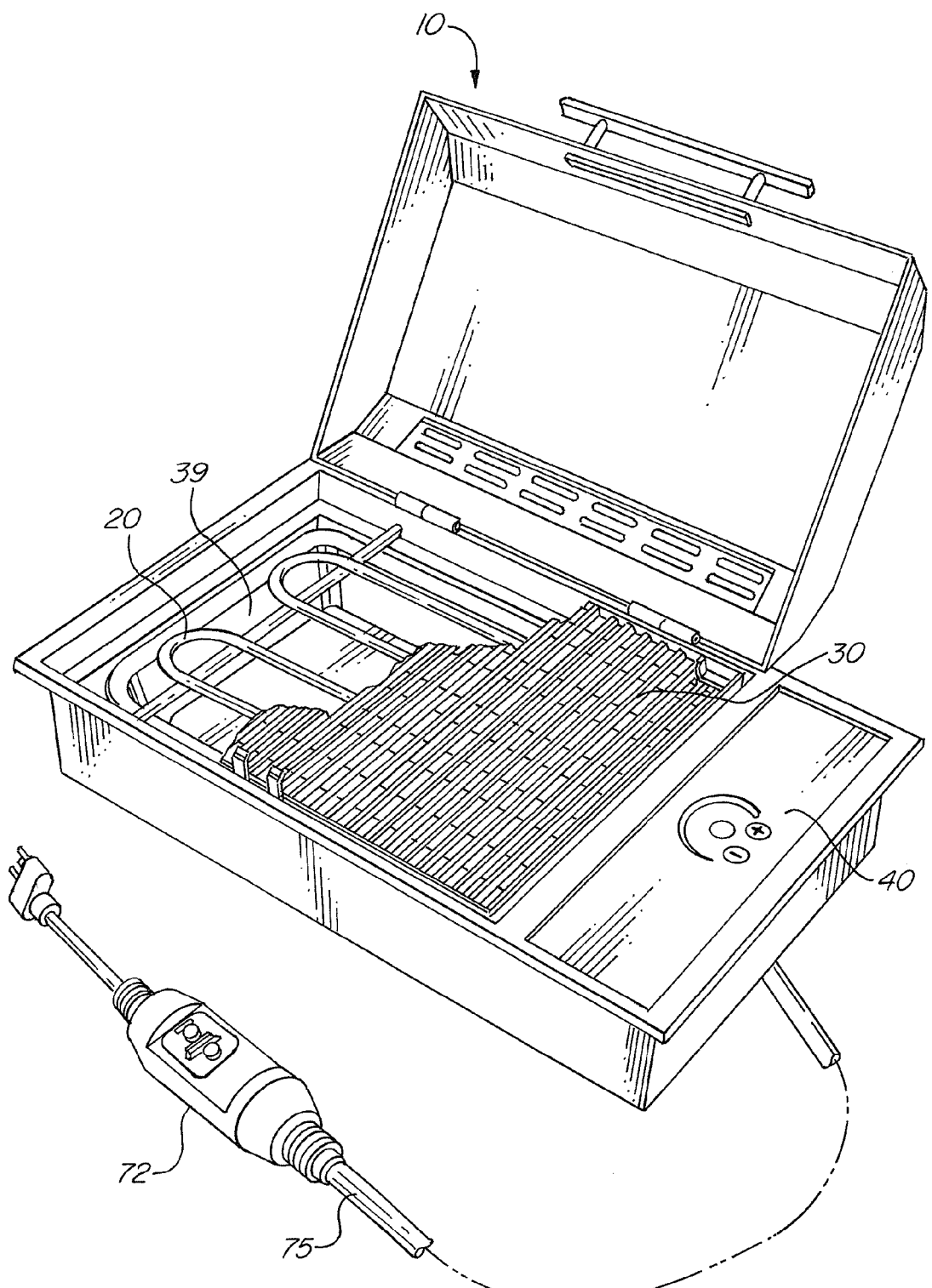
FIG. 1 depicts the grill in accordance with the invention.

FIG. 1 depicts grill 10 in accordance with the invention. Grill 10 includes heating element 20 for providing heat to cook food, grate 30 placed over heating element 20, and touch control 40 for controlling heating element 20 and for indicating the intensity of heat being emitted from heating element 20. Further, grill 10 includes ground fault interrupt ("GFI") 72 attached to power cord 70.

Figure 2:
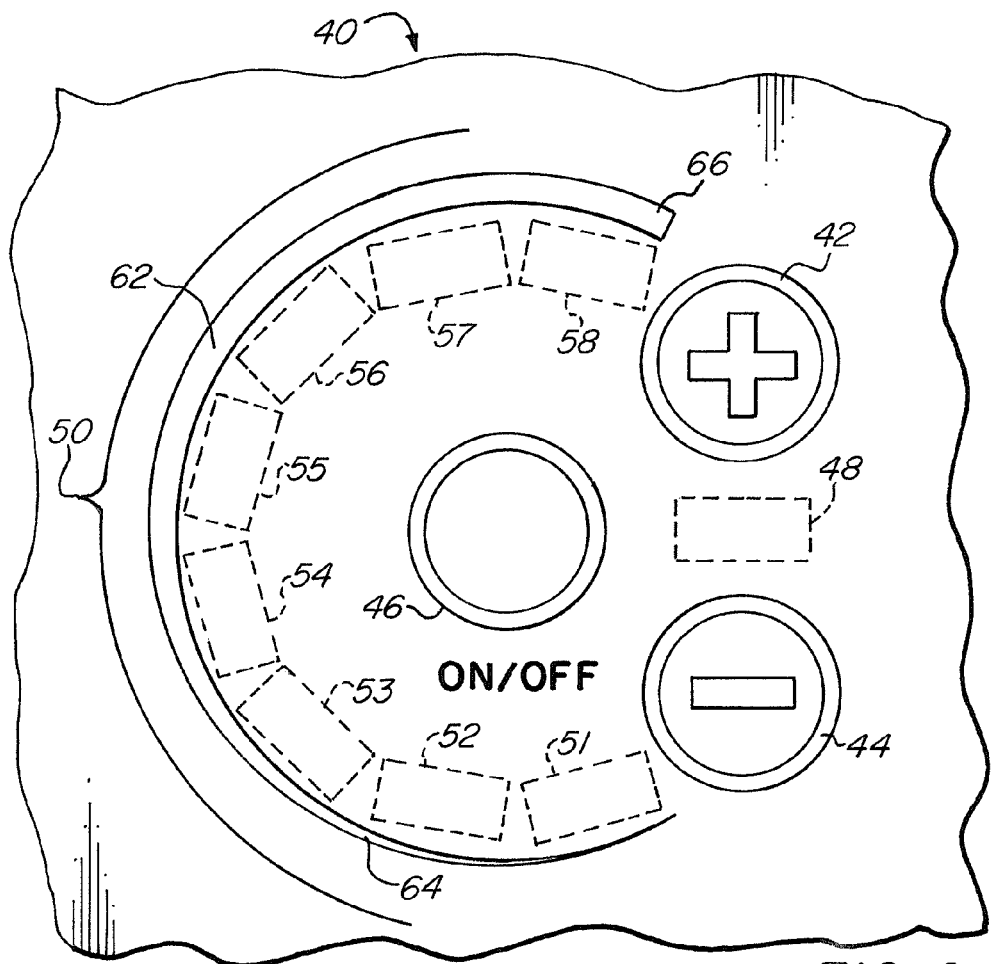
FIG. 2 more particularly depicts the touch control as shown in FIG. 1.

As shown more particularly in FIG. 2, touch control 40 has increase button 42, decrease button 44, power button 46, and first light through eighth light 51-58 (collectively plurality of lights 50) that are arranged sequentially and in a shape of an arc around power button 46. Power level indicator 62 is also arranged in a shape of an arc around plurality 50 of lights. Additionally, control 40 also includes power indicator 48 for indicating whether or not grill 10 is on or off, respectively.

In the embodiment shown, when grill 10 is turned on by pressing power button 46, power indicator 48 is lit. When the user continues to press or actuate increase button 42, plurality 50 of lights illuminate in sequential order from first light 51 until the nth light, where the nth light can be any one of the lights from first light to eighth light 51-58 and where the value of n is determined based upon how hot the user wants heating element 20. If the user sets heating element to its lowest setting, only first light 51 will be illuminated. If the user presses increase button 42 to its next setting or next elevated temperature for cooking, first and second light 51, 52 will be illuminated. This continues until the user wants heating element 20 at its hottest level or most elevated temperature for cooking, in which all eight lights 51-58 will be illuminated.

Regardless of the temperature setting, first light 51 is illuminated before second light 52, and second light 52 is illuminated before third light 53, and this continues until eighth light 58. Further, the number of lights illuminated, or the value of n, is in direct proportion or has a linear relationship to the user actuating increase button 42.

Likewise, the number of lights illuminated decreases in direct proportion, or has a linear relationship, with the actuation of decrease button 44.

Control 40 operates in an easy to read manner such that the user is able to obtain information quickly without having to scan large areas of the grill or read small minutia on a dial or gauge. Because plurality 50 of lights are arranged in an arc, and because the quantity of lights being lit around power button 46 gives the user a visual indication of the level of heat emitted from heating element 20, control 40 gives the user useful information about heating element 20 in a compact area so it is more beneficial than traditional touch controls that are in a straight line across a substantial width of the grill. Moreover, other traditional grills using dials or digital displays with numerals or other minutia are often difficult to read as opposed to plurality 50 of lights.

In the embodiment show, plurality 50 of lights include eight lights, which means n is any value between 1 and 8. In other embodiments, plurality 50 of lights include numerous lights of any quantity, such as 10, 25, or even 1000, which means n is any value between 1 and 10, 1 and 25, or 1 and 1000, respectively.

In the event the user needs to be reminded as to whether or not the number of lights being illuminated indicates a level of heat being emitted from heating element 20, the thickness of power level indicator 62 from narrow end 64 to thick end 66 indicates the heat output, where thick end 66 is proximate to eighth light 58 and narrow end is proximate to first light 51.

Figure 4:
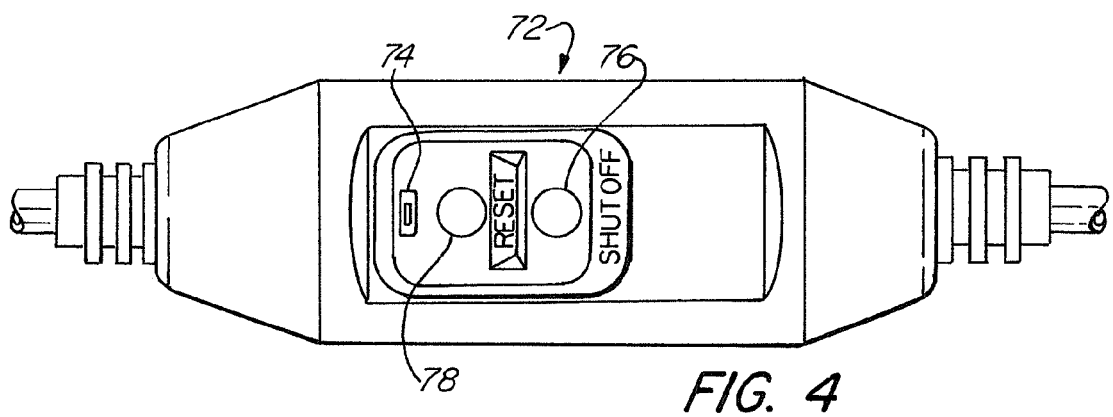
FIG. 4 more particularly depicts the ground fault interrupt as shown in FIG. 1.

As shown in FIG. 4, GFI 72 includes indicator light 74 for indicating whether or not power is being supplied to grill 10, emergency power cut-off button 76 for cutting power to grill 10, and reset button 78 for restoring power to grill 10. In an emergency situation, such as when there is a fire or fuel leak proximate to grate 30 or heating element 20, the user can press emergency power cut-off button 76 to cut electricity or gas and alleviate the emergency situation. The user may then restore power by actuating reset button 78. Indicator light 74 indicates when power, such as electricity or gas, is being supplied or not to heating element 20 when it is lit or unlit, respectively.

Because GFI 72 is located on power cord 75 and away from grate 30 and heating element 20, it is easy for the user to reach during an emergency since most emergencies are due to a problem, such as a fire, located at or near grate 30 or heating element 20.

Figure 3:
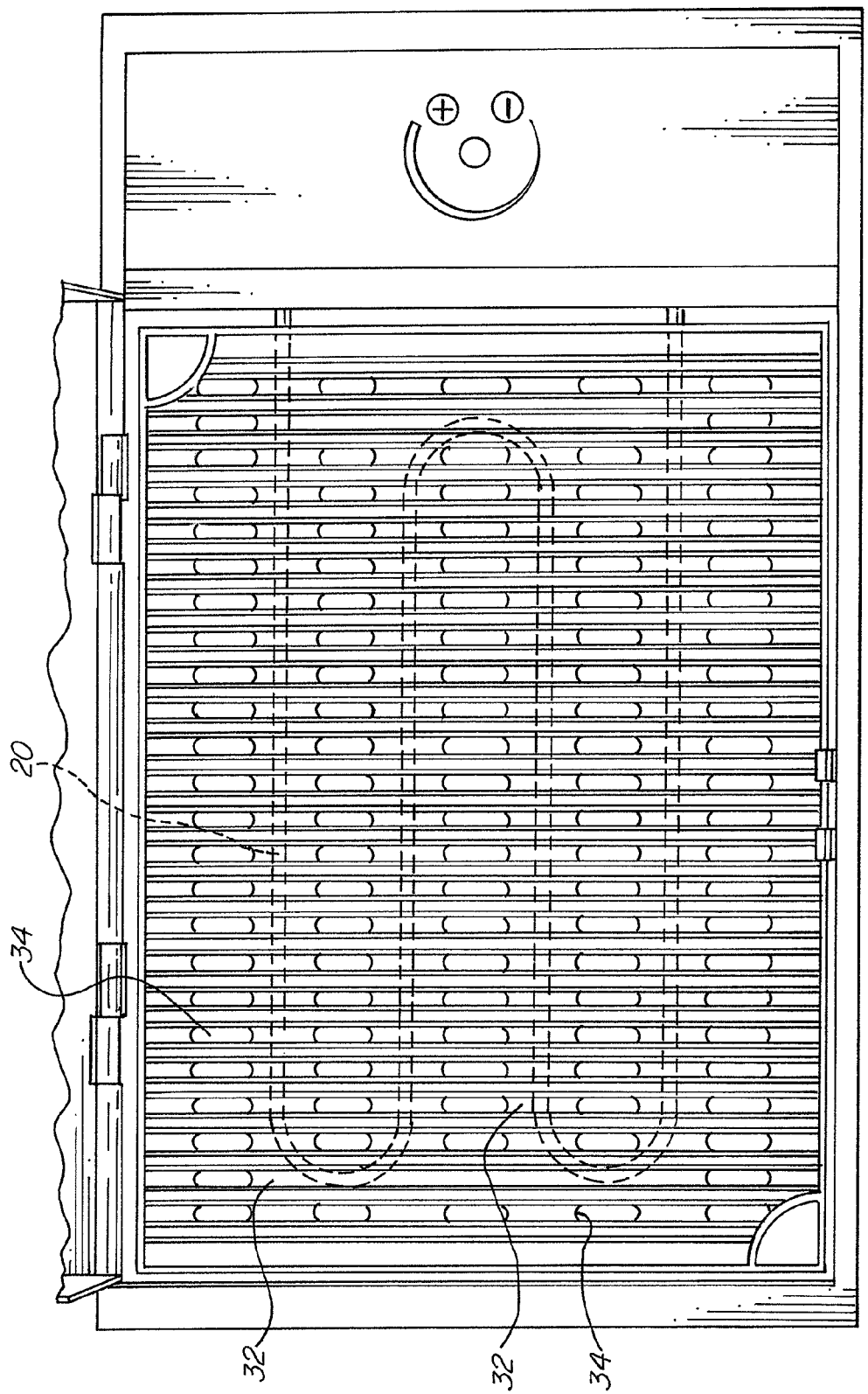
FIG. 3 more particularly depicts the grate and heating element as shown in FIG. 1.
Figure 5:
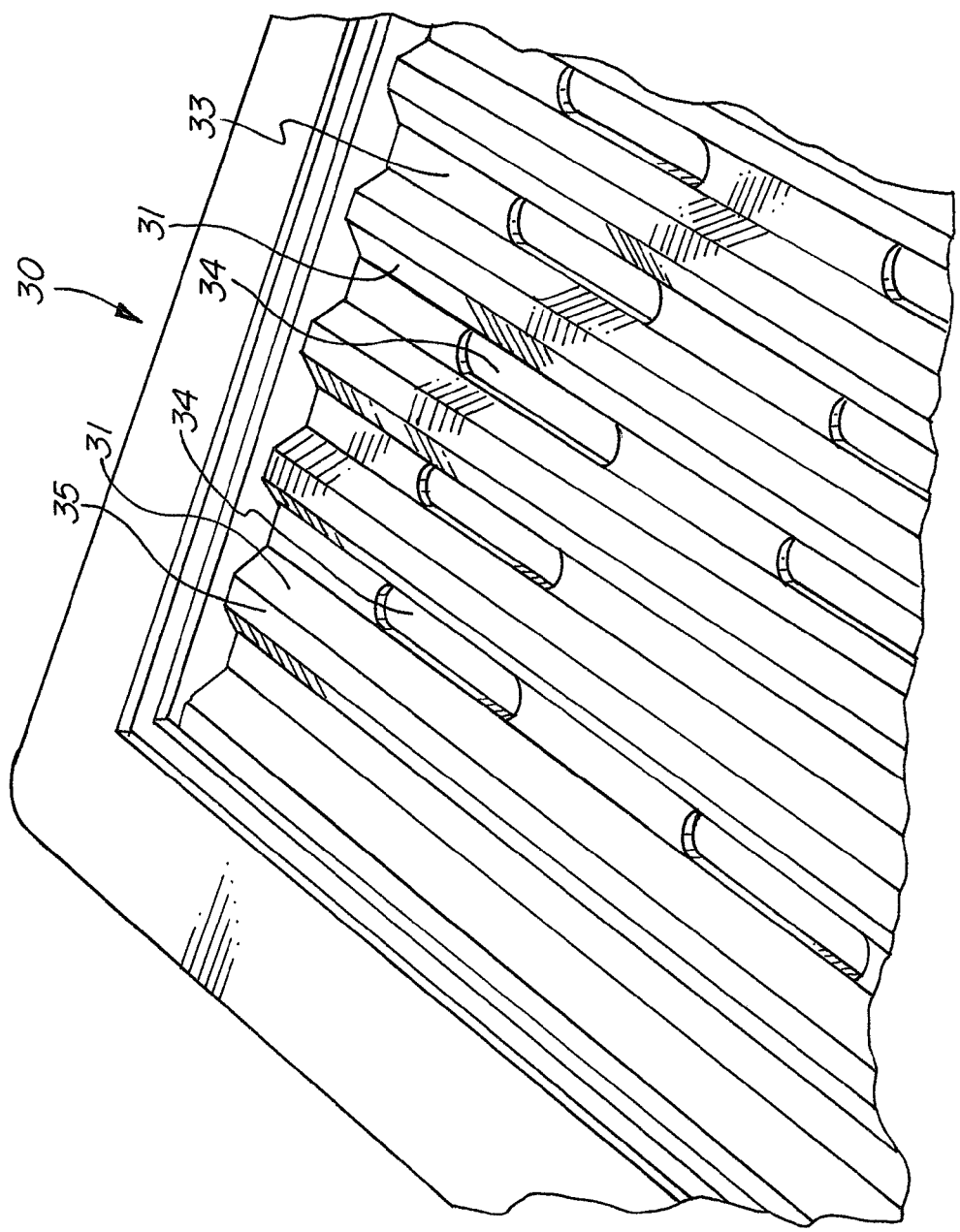
FIG. 5 more particularly depicts the grate shown in FIG. 1.

As shown in FIGS. 1, 3, and 5, grate 30 includes opening 34 for permitting grease to pass through and into drip pan 39 and cover 32, which is defined to be any part of grate 30 positioned over heating element 20 and not having any openings 34. Because cover 32 is without any openings 34, it is more difficult for grease or food to contact heating element 20, which results in a reduction in flare ups and smoking. Moreover, since heating element 20 is not directly under the food, there is a reduction in hot spots. As depicted, openings 34 are placed in grate 30 around heating element 20.

As shown in FIG. 5, grate 30 also includes angled side 31 for directing grease toward opening 34. Angled side 31 extends from valley 33 toward cooking surface 35.

In some embodiments, grill 10 further includes an automatic shut off switch, which comprises at least one temperature sensor and at least one timer. A temperature sensor in communication with heating element 20 can be set at a user determined or manufacturer determined maximum setting, such as 300 degrees Fahrenheit or some other temperature determined to be unsafe, such as a code or standard in the industry, whereupon heating element 20 reaching this temperature would cause the temperature sensor to send a signal to shut grill 10 off. For example, the signal may be an electric signal sent to GFI 72 to power grill 10 off.

Although the signal to power grill 10 off is sent to GFI 72, the power relay that physically cuts the power may be located any where, whether proximate to grill 10 or GFI 72.

The timer may be set at a user determined or manufacturer determined maximum setting, whereupon heating element 20 being on for this maximum amount of time would cause the timer to send a signal to shut grill 10 off. For example, the signal may be an electric signal sent to GFI 72 to power grill 10 off. The following table is an example of times that the timer may be set, after which grill 10 powers itself off.

| SETTING | PRE-HEAT TIME (min.) | AUTO SHUT-OFF (min) |
|---|---|---|
| 1 | 1 | 91 |
| 2 | 3 | 93 |
| 3 | 3 | 93 |
| 4 | 5 | 95 |
| 5 | 5 | 95 |
| 6 | 7 | 97 |
| 7 | 7 | 97 |
| 8 | 7 | 97 |

Although the invention has been described with reference to a particular arrangement of parts, features and the like, these are not intended to exhaust all possible arrangements or features, and indeed many other modifications and variations will be ascertainable to those of skill in the art.

What is claimed is:

1. A grill, comprising:
   a heating element for heating food;
   a cooking grate having a surface positioned above said heating element and having a plurality of openings for permitting grease to pass where said plurality of openings are arranged around said heating element;
   a pan having a surface below said heating element;
   said pan being directly beneath said plurality of openings such that the grease passes directly to said pan from said plurality of openings without contacting said heating element;
   a touch control for adjusting a temperature of said heating element;
   said touch control having a power button, an increase button to elevate the temperature of said heating element, and a decrease button to lower the temperature of said heating element;
   said touch control having a plurality of lights arranged in sequential order from a first light to an nth light and arranged in an arc around said power button;

an indicator light for indicating whether or not power is being supplied to the grill, an emergency power cut-off button for cutting power to the grill, and a reset button for restoring power to the grill;

an automatic shut-off switch that automatically cuts power to the grill;

wherein manipulation of said increase button commences illumination of said plurality of lights beginning with said first light and ending with said nth light;

wherein manipulation of said decrease button extinguishes illumination of said plurality of lights beginning with said nth light and ending with said first light; and wherein n is a value selected from the group consisting of 1-1000 wherein the grill further comprises sidewalls around each side of said pan, wherein said pan extends to at least one of said sidewalls; and wherein said cooking grate includes a cover positioned over said heating element and said plurality of openings are arranged around said cover.

2. The grill according to claim 1, further comprising a power level indicator arranged in an arc around said plurality of lights and gradually expanding in size as said power level indicator extends toward said nth light.

3. The grill according to claim 1, wherein n is a value selected from the group consisting of 1-8.

4. The grill of claim 1, whereby said pan is removable from said grill.

* * * * *